W. J. MURPHY & W. H. COCK.
Rotary Harrows.

No. 156,938.  Patented Nov. 17, 1874.

WITNESSES:
Francis McArdle
A. F. Terry

INVENTOR:
William Joseph Murphy
William Henry Cock
BY
Munn & Co
ATTORNEYS.

UNITED STATES PATENT OFFICE.

WILLIAM J. MURPHY AND WILLIAM H. COCK, OF MURFREESBOROUGH, TENNESSEE.

IMPROVEMENT IN ROTARY HARROWS.

Specification forming part of Letters Patent No. 156,938, dated November 17, 1874; application filed August 15, 1874.

*To all whom it may concern:*

Figure 1:
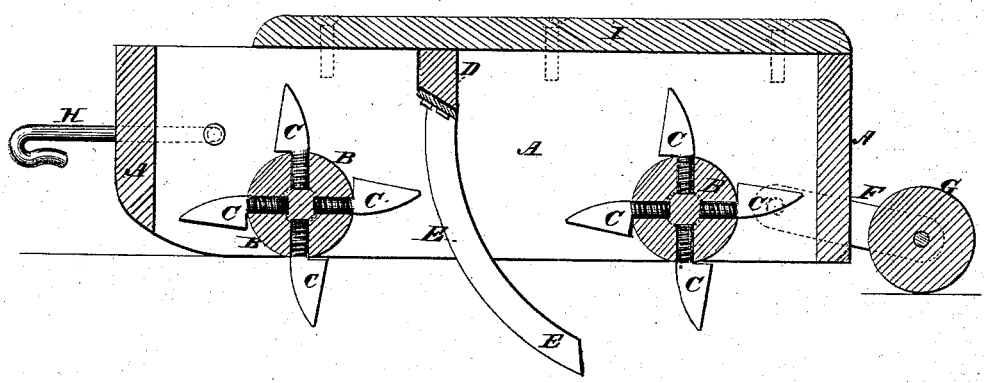
Figure 2:
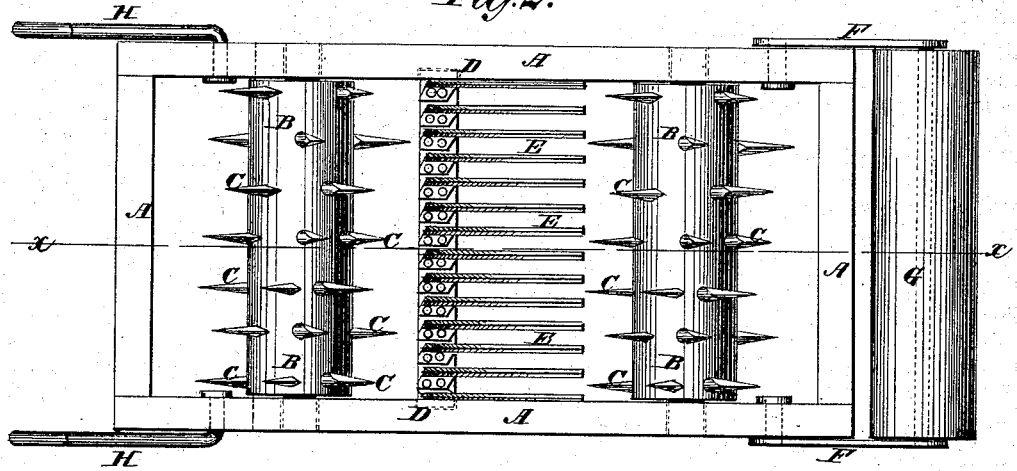

Be it known that we, WILLIAM JOSEPH MURPHY and WILLIAM HENRY COCK, of Murfreesborough, in the county of Rutherford and State of Tennessee, have invented a new and useful Improvement in Harrow, of which the following is a specification:

Figure 1 is a vertical longitudinal section of our improved harrow, taken through the line *x x*, Fig. 2. Fig. 2 is an under-side view of the same.

Similar letters of reference indicate corresponding parts.

Our invention has for its object to furnish an improved harrow, which shall be so constructed as to thoroughly loosen and stir up the soil, cutting up and pulverizing the sods, clods, lumps, &c., leaving the soil in fine condition, and which shall be simple in construction, and of light draft.

The invention consists in the combination of the land-roller with the frame of the harrow, one or more rollers, and sets of knives, and one or more cross-bars and sets of curved stationary knives, as hereinafter fully described.

A is the frame of the harrow, which is made of inch-and-a-half or two-inch plank, spiked or otherwise securely connected together. The height or depth of the frame A depends upon the size of the rollers and the length of the knives. B are two rollers, a foot, more or less, in diameter, and the journals of which revolve in bearings in the side bars of the frame A, in such positions that the lower sides of said rollers may be about upon a level with the lower edge of the frame A. To the rollers B are attached knives C, the shanks of which are four or five inches long, and have screw-threads cut upon them, so that they may be screwed into the rollers B. The outer part of the knives C is about six inches long, from one and a half to one and three-fourths inches wide at their base or shoulder, and about an inch thick at the back. D is a cross-bar, the ends of which are inserted in short grooves in the upper part of the inner surface of the sides of the frame A, so that the said cross-bar and its attached knives can be readily detached, when desired. To the cross-bar D is securely bolted the upper ends of a series of knives, E, which are so arranged that their paths may be midway between the paths of the knives C of the rollers B. The knives E are curved to the rearward, and should be made of such a length that they may enter the ground about an inch farther than the knives C. A cross-bar, D, and set of stationary knives E are designed to be placed in front of each roller B. To the lower rear part of the sides of the frame A are attached or pivoted the ends of two bars, F, in holes in the rear ends of which revolve the journals of a roller, G, which is designed to roll and smooth the ground in the rear of the harrow. To the forward ends of the sides of the frame A are attached draw-bars H, to which the draft is applied. The lower side of the forward end of the frame A is rounded off, so that the harrow may pass over the ground readily. To the upper edge of the frame A are attached cross bars or planks I, to strengthen said frame, and to serve as a platform to place weights upon, when desired.

Having thus described our invention, we claim as new and desire to secure by Letters Patent—

The combination of the roller G with the frame A, one or more rollers, B, and sets of knives C, and one or more cross-bars, D, and sets of curved stationary knives E, substantially as herein shown and described.

WILLIAM JOSEPH MURPHY.
WILLIAM HENRY COCK.

Witnesses:
CHAS. R. HOLMES,
JNO. B. JOHNS.